United States Patent [19]
Bonicel et al.

[11] Patent Number: 4,555,539
[45] Date of Patent: Nov. 26, 1985

[54] FIREPROOF POLYMER MATERIAL

[75] Inventors: Jean-Pierre Bonicel, Lyons; Madeleine Prigent, Marcoussis; Christian Cottevieille, Montreuil, all of France

[73] Assignee: Les Cables de Lyon, S.A., Clichy Cedex, France

[21] Appl. No.: 359,077

[22] Filed: Mar. 17, 1982

[30] Foreign Application Priority Data

Mar. 19, 1981 [FR] France .................... 81 05491

[51] Int. Cl.$^4$ ............................................. C08K 5/52
[52] U.S. Cl. ................................. 524/127; 524/411
[58] Field of Search ............... 525/227; 524/127, 411, 524/523, 371

[56] References Cited

U.S. PATENT DOCUMENTS

| | | | |
|---|---|---|---|
| 2,953,541 | 9/1980 | Pecha et al. | 525/227 |
| 3,285,965 | 11/1966 | Jenkner | 524/371 |
| 3,927,145 | 12/1975 | Gaeckel | 525/523 |
| 4,087,402 | 5/1978 | Monte et al. | 524/398 |
| 4,100,076 | 7/1978 | Ashman et al. | 524/127 |
| 4,129,616 | 12/1978 | Zingheim | 524/371 |
| 4,247,446 | 1/1981 | Betts et al. | 260/42.42 |
| 4,255,323 | 3/1981 | Barkis et al. | 524/371 |
| 4,312,918 | 1/1982 | Bostwick | 525/227 |
| 4,417,009 | 11/1983 | Sugerman et al. | 524/127 |

FOREIGN PATENT DOCUMENTS

| | | |
|---|---|---|
| 0007748 | 2/1980 | European Pat. Off. . |
| 2109779 | 5/1972 | France . |
| 2041960 | 9/1980 | United Kingdom . |

Primary Examiner—Veronica P. Hoke
Attorney, Agent, or Firm—Kenyon & Kenyon

[57] ABSTRACT

A polymer material which contains ethylene groups and is made fireproof by an organic brominated additive, antimony oxide and optionally a phosphate or pyrophosphate containing titanate. It contains:

(a) a non-reticulated polymer matrix containing 40% to 60% by weight of polyethylene and 40% to 60% by weight of a copolymer of ethylene and of alkyl acrylate;

(b) 25% to 35% by weight related to the weight of the polymer matrix of the organic brominated additive which is decabromodiphenyloxide, octabromodiphenyl or hexabromodiphenyl;

(c) 8% to 19% by weight related to the weight of the polymer matrix of antimony oxide (d) and optionally 0.1% to 0.5% by weight related to the weight of the polymer matrix of an organo phosphate containing a phosphate or pyrophosphate radical.

2 Claims, No Drawings

FIREPROOF POLYMER MATERIAL

FIELD OF THE INVENTION

The present invention relates to a fireproof polymer compound which contains:
- (a) a polymer substance containing polyethylene and a copolymer of ethylene and of alkyl acrylate;
- (b) 25% to 35% by weight relative to the weight of the polymer substance, of a brominated organic additive; and
- (c) 8% to 17% by weight relative to the weight of the polymer substance, of antimony oxide.

BACKGROUND OF THE INVENTION

U.S. Pat. No. 4,247,446 describes a fireproof polymer substance based on a reticulated polyolefin containing polyethylene and a copolymer of ethylene and of another polymerisable compound, in particular alkyl acrylate as well as decabromodiphenyl ether and antimony oxide.

British patent application No. 2 041 960 describes a fireproof polymer compound containing polyethylene, a copolymer of ethylene and of another polymerisable compound such as ethyl acrylate, a hydrated metal oxide powder such as hydrated alumina and a coupling agent formed by an organic titanate, in particular isopropyl-tri (dioctylphosphate) titanate or isopropyl-tri (dioctylpyrophosphate) titanate intended to improve its extensibility.

Polymers hardened by reticulation in accordance with U.S. Pat. No. 4,247,446 are very much less elastic than elastomeric polymers and are insufficiently flexible. Further, they are more expensive and more difficult to put into use than non-reticulated polymers, in particular when manufacturing sheaths for electric cables. Those in accordance with British patent application No. 2 041 960 have a very high proportion of hydrated metal oxide which makes them unsuitable for manufacturing sheaths for electric cables by extrusion in industrial conditions.

Preferred embodiments of the present invention provide a polymer compound having high elasticity and high flexibility and which is cheap and easy to put into use in particular by extrusion while being as fire proof as known compounds.

SUMMARY OF THE INVENTION

The present invention provides a fireproof polymer material which comprises:
- (a) a polymer containing polyethylene and a copolymer of ethylene and of alkyl acrylate;
- (b) 25% to 35% by weight relative to the weight of the polymer matrix of an organic brominated additive; and
- (c) 8% to 17% by weight relative to the weight of the polymer matrix of antimony oxide;

wherein the polymer matrix is a non-reticulated mixture of 40% to 60% by weight of polyethylene and 40% to 60% of copolymer of ethylene and of alkyl acrylate.

The compound also preferably includes 0.1% to 0.5% by weight (relative to the weight of the polymer matrix) of an organic titanate containing a phosphate or pyrophosphate radical, advantageously isopropyltri-(dioctyl pyrophosphato)titanate and/or 2 to 5000 parts per million (relative to the weight of the polymer matrix) of an anti-oxidizer.

DESCRIPTION

Polymer compounds in accordance with the invention and their fire-resistant properties and mechanical strength, as well as, by way of comparison, those of compounds not in accordance with the present invention are described hereinbelow.

50 parts by weight of polyethylene and 50 parts by weight of ethylene copolymer and of ethyl acrylate are mixed together when hot. To this mixture is added 30 parts by weight of decabromodiphenyloxide and 15 parts by weight of antimony oxide $Sb_2O_3$ and 5000 parts per million of an antioxidizer (e.g. a phenol derivative commercialized under the trade names Irganox 10-10 or 10-76 by Ciba-Geigy) and mixing is continued until a homogeneous product is obtained. Then, an analogous product is prepared to which, however, 0.3 parts by weight of isopropyl-tri(dioctylpyrophosphato)titanate are added. Their flame resistance and their mechanical properties are measured and compared with those of pure polyethylene and of pure ethyl ethylene-acrylate copolymer to which are added the same proportions of decabromodiphenyloxide and antimony oxide.

The flame resistance was measured by the two following tests:

Firstly, a measurement is made of the limit oxygen index value, defined as the minimum oxygen content in an oxygen-nitrogen mixture which maintains the combustion of a bar of material disposed vertically and lit at the top (US standard ASTMD 2863, of 1970).

Then, test UL94 is carried out. This consists in burning a test bar 3 mm thick twice for 10 seconds in air and checking whether it rapidly stops burning.

The mechanical properties tested are breaking strength and breaking elongation.

Measurements taken give the following as a function of the compositions of the mixtures.

| | | | | |
|---|---|---|---|---|
| Polyethylene | 100 | 0 | 50 | 50 |
| Ethylene ethyl-acrylate copolymer | 0 | 100 | 50 | 50 |
| Decabromo-diphenyloxide | 30 | 30 | 30 | 30 |
| $Sb_2O_3$ | 15 | 15 | 15 | 15 |
| Titanate | | | | 0.3 |
| Phenolic anti-oxidizing agent | 0.05 | 0.05 | 0.05 | 0.05 |
| Limit oxygen index value | 24.7 | 26.3 | 27 | 27.5 |
| UL-94 | bad | bad | bad | good |
| Breaking strength (bars) | 102.5 | 138.6 | 122 | 148 |
| Breaking elongation (%) | 430 | 706 | 530 | 600 |

It is seen that the compounds in accordance with the invention in the last two columns have a clearly higher flame resistance than compounds based on pure polyethylene or pure ethyl ethylene acrylate copolymer.

Also, after combustion they present low chemical aggressivity, and they maintain their mechanical properties satisfactorily after 5 days' aging at 100° C.

Although the materials in accordance with the invention which have just been described hereinabove appear to be preferable, it will be understood that various modifications can be made thereto without going beyond its scope. In particular, decabromodiphenyloxide can be replaced by octabromodiphenyl or hexabromodiphenyl. Isopropyl-tri(dioctylpyrophosphato)titanate can be replaced by isopropyl-tri(dioctylphosphato)titanate, di(dioctylpyrophosphato)ethylene-titanate, di(dioctylphosphato)ethylene-titanate, titanium di(dioctylpyrophosphato)oxycetate, titanium di(dioctylphosphato)oxyacetate or tri(butyl-octyl, pyrophosphato)ethylene titanate.

Further, additives can be mixed with the material to confer particular properties thereto.

The material in accordance with the invention is particularly suitable for sheathing electric cables, in particular telephone cables.

We claim:
1. A fireproof polymer material, which comprises:
   (a) a polymer material containing polyethelene and a copolymer of ethylene and of alkyl acrylate;
   (b) 25% to 35% by weight relative to the weight of the polymer matrix of a brominated diphenyloxide;
   (c) 8% to 17% by weight relative to the polymer matrix of antimony oxide; and
   (d) 0.1% to 0.5% by weight relative to the weight of polymer matrix of an organic titanate selected from the group consisting of isopropyl-tri(dioctylpyrophosphato)titanate, isopropyl-tri(dioctylphosphato)titanate, di(dioctylpyrophosphato)ethylene-titanate, di(dioctylphosphato)ethylene-titanate, titanium di(dioctylpyrophosphato)oxyacetate, and tri(butyl-octyl, pyrophosphato)ethylene-titanate, wherein the polymer material is a non reticulated mixture of 40% to 50% by weight of polyethylene and 50% to 60% of copolymer of ethylene and of alkyl acrylate.

2. A polymer material according to claim 1 wherein it also contains 2 to 5000 parts per million related to the weight of the polymer matrix of antioxidant.

* * * * *

UNITED STATES PATENT AND TRADEMARK OFFICE
CERTIFICATE OF CORRECTION

PATENT NO. : 4,555,539
DATED : 26 November 1985
INVENTOR(S) : Jean-Pierre BONICEL et al.

It is certified that error appears in the above-identified patent and that said Letters Patent is hereby corrected as shown below:

Column 1, line 29: change "dioctylphosphate" to --dioctylphosphato--.

Column 1, line 30: change "dioctylpyrophosphate" to --dioctylpyrophosphato--.

Column 3, line 1: change "oxycetate" to --oxyacetate--.

Signed and Sealed this

Twenty-ninth Day of April 1986

[SEAL]

Attest:

DONALD J. QUIGG

Attesting Officer

Commissioner of Patents and Trademarks